(12) United States Patent
Totale et al.

(10) Patent No.: US 9,756,147 B1
(45) Date of Patent: Sep. 5, 2017

(54) DYNAMIC DISCOVERY AND MANAGEMENT OF PAGE FRAGMENTS

(71) Applicant: Open Text Corporation, Waterloo (CA)

(72) Inventors: Sachin G. Totale, Bangalore (IN); Marwan Suliman, Dublin, CA (US); Deepak Michael, Bangalore (IN); Roshan Prakash Salvi, Bangalore (IN); Shubha Ravi, Bangalore (IN); Rajakumar Thiruvasagam, Bangalore (IN)

(73) Assignee: Open Text Corporation, Waterloo, CA (US)

( * ) Notice: Subject to any disclaimer, the term of this patent is extended or adjusted under 35 U.S.C. 154(b) by 329 days.

(21) Appl. No.: 14/136,255

(22) Filed: Dec. 20, 2013

(51) Int. Cl.
*H04L 29/06* (2006.01)
*G06F 9/445* (2006.01)
*G06F 9/44* (2006.01)

(52) U.S. Cl.
CPC ............ *H04L 67/42* (2013.01); *G06F 8/38* (2013.01); *G06F 9/445* (2013.01)

(58) Field of Classification Search
CPC ............ G06F 9/445–9/44594; G06F 17/00–17/30008; G06F 8/38; H04L 67/00–67/42
See application file for complete search history.

(56) References Cited

U.S. PATENT DOCUMENTS

| | | | |
|---|---|---|---|
| 4,910,660 A | 3/1990 | Li | |
| 5,079,690 A | 1/1992 | Li | |
| 5,644,738 A | 7/1997 | Goldman et al. | |
| 6,226,627 B1 | 5/2001 | Polak | |
| 6,304,886 B1 | 10/2001 | Bernardo et al. | |
| 6,724,403 B1 | 4/2004 | Santoro et al. | |
| 7,013,469 B2 | 3/2006 | Smith et al. | |
| 7,225,425 B2 | 5/2007 | Kompalli et al. | |
| 7,734,995 B2 | 6/2010 | Saikaly | |
| 7,797,432 B2 | 9/2010 | Volodarsky et al. | |
| 7,933,632 B2 | 4/2011 | Flynt et al. | |
| 8,156,481 B1 | 4/2012 | Koh et al. | |
| 8,271,899 B1 | 9/2012 | Blackburn et al. | |
| 8,321,681 B2 | 11/2012 | Tulchinsky et al. | |
| 8,346,889 B1 * | 1/2013 | Chiu ................ G06F 9/44521 | 709/203 |
| 8,560,959 B2 | 10/2013 | Zaman et al. | |
| 8,572,268 B2 | 10/2013 | Wray | |
| 9,170,786 B1 | 10/2015 | Totale | |
| 2002/0194393 A1 | 12/2002 | Hrischuk et al. | |
| 2003/0004770 A1 | 1/2003 | Miller et al. | |

(Continued)

OTHER PUBLICATIONS

The PHP Group, What is PHP?, Jan. 23, 2009.

(Continued)

*Primary Examiner* — Clayton R Williams
(74) *Attorney, Agent, or Firm* — Sprinkle IP Law Group

(57) ABSTRACT

Techniques to dynamically discover and manage page fragments, e.g., to provide a dynamic application user interface, are disclosed. In various embodiments, an indication to add a fragment dynamically to a current application page is received. The fragment to be added is determined, in response to the indication, and added dynamically to the current application page.

17 Claims, 5 Drawing Sheets

(56) References Cited

U.S. PATENT DOCUMENTS

| | | | |
|---|---|---|---|
| 2003/0023641 A1* | 1/2003 | Gorman | G06F 17/21 |
| | | | 715/234 |
| 2003/0222906 A1 | 12/2003 | Fish et al. | |
| 2004/0044987 A1 | 3/2004 | Kompalli et al. | |
| 2005/0022157 A1 | 1/2005 | Brendle et al. | |
| 2005/0114849 A1 | 5/2005 | Megiddo | |
| 2005/0149908 A1 | 7/2005 | Klianev | |
| 2005/0166207 A1 | 7/2005 | Baba et al. | |
| 2006/0053421 A1 | 3/2006 | Dickenson | |
| 2006/0074704 A1 | 4/2006 | Shukla et al. | |
| 2006/0074733 A1 | 4/2006 | Shukla et al. | |
| 2006/0236304 A1 | 10/2006 | Luo et al. | |
| 2006/0236306 A1* | 10/2006 | DeBruin | G06F 8/51 |
| | | | 717/113 |
| 2007/0055591 A1* | 3/2007 | Enenkiel | G06Q 40/123 |
| | | | 705/31 |
| 2007/0266368 A1 | 11/2007 | Szpak et al. | |
| 2008/0046868 A1 | 2/2008 | Tsantilis | |
| 2008/0281944 A1* | 11/2008 | Vorne | H04L 29/08846 |
| | | | 709/218 |
| 2009/0019386 A1 | 1/2009 | Sweetland et al. | |
| 2009/0055725 A1 | 2/2009 | Portnov et al. | |
| 2009/0210631 A1 | 8/2009 | Bosworth et al. | |
| 2009/0307670 A1 | 12/2009 | Kashyap et al. | |
| 2010/0211420 A1 | 8/2010 | Kodi et al. | |
| 2010/0281462 A1 | 11/2010 | Festa | |
| 2010/0293056 A1 | 11/2010 | Flynt et al. | |
| 2011/0225565 A1 | 9/2011 | Van Velzen et al. | |
| 2011/0246549 A1* | 10/2011 | Katzenberger | G06F 9/505 |
| | | | 709/201 |
| 2012/0131442 A1 | 5/2012 | Grizim et al. | |
| 2012/0166992 A1 | 6/2012 | Huynh et al. | |
| 2013/0019172 A1 | 1/2013 | Kotler et al. | |
| 2013/0019182 A1 | 1/2013 | Gil et al. | |
| 2013/0205193 A1* | 8/2013 | Matsufuji | G06Q 10/06 |
| | | | 715/234 |
| 2013/0219263 A1 | 8/2013 | Abrahami | |
| 2013/0290380 A1 | 10/2013 | Flickner et al. | |
| 2014/0201232 A1 | 7/2014 | Berry et al. | |
| 2014/0245262 A1 | 8/2014 | Hill et al. | |
| 2016/0054986 A1 | 2/2016 | Totale | |

OTHER PUBLICATIONS

Author Unknown, Kohana Team, Session Library, Jan. 2012, retrieved from http://www.hcs.harvard.edu/-powerpak/kohanadocs/libraries/session.html, 6 pages.

Author Unknown, www.gwtproject.org, GWT, Jul. 2013, retrieved from https ://web. archive.org/web/20130708095321 /http://www.gwtproject.org/doc/latest/DevGuideHtml5Storage. html , 7 pages.

Author Unknown, w3schools.com, "HTML5 Web Storage", Nov. 2012, retrieved from https://web.archive.org/web/20121123023047/http://www.w3schools.com/html/htm15_webstorage.asp, 3 pages.

Office Action for U.S. Appl. No. 14/136,287, mailed Dec. 17, 2014, 10 pgs.

Office Action for U.S. Appl. No. 14/136,232, mailed Sep. 11, 2015, 15 pgs.

Office Action for U.S. Appl. No. 14/136,232, mailed Feb. 1, 2016, 17 pgs.

Office Action for U.S. Appl. No. 14/136,232, mailed Sep. 22, 2016, 18 pgs.

Office Action for U.S. Appl. No. 14/136,232, mailed Mar. 10, 2017, 19 pgs.

* cited by examiner

DYNAMIC DISCOVERY AND MANAGEMENT OF PAGE FRAGMENTS

BACKGROUND OF THE INVENTION

In a typical web application, sections of web pages can be divided in multiple sections and some of these sections may be reusable across web pages. To reduce the duplication of similar markup/code, typically these sections are stored in separated files (e.g., fragments), then these fragments are included in the different pages using specialized markups (e.g. <include>). Typically, the fragments to be included on a page are predefined and the interactions between fragments are well known at application development time.

The classical approach to the use of fragments facilitates fragment reuse but has limitations in terms of the variety and nature of dynamic behavior that can be provided using prior approaches.

BRIEF DESCRIPTION OF THE DRAWINGS

Various embodiments of the invention are disclosed in the following detailed description and the accompanying drawings.

DETAILED DESCRIPTION

Figure 1:
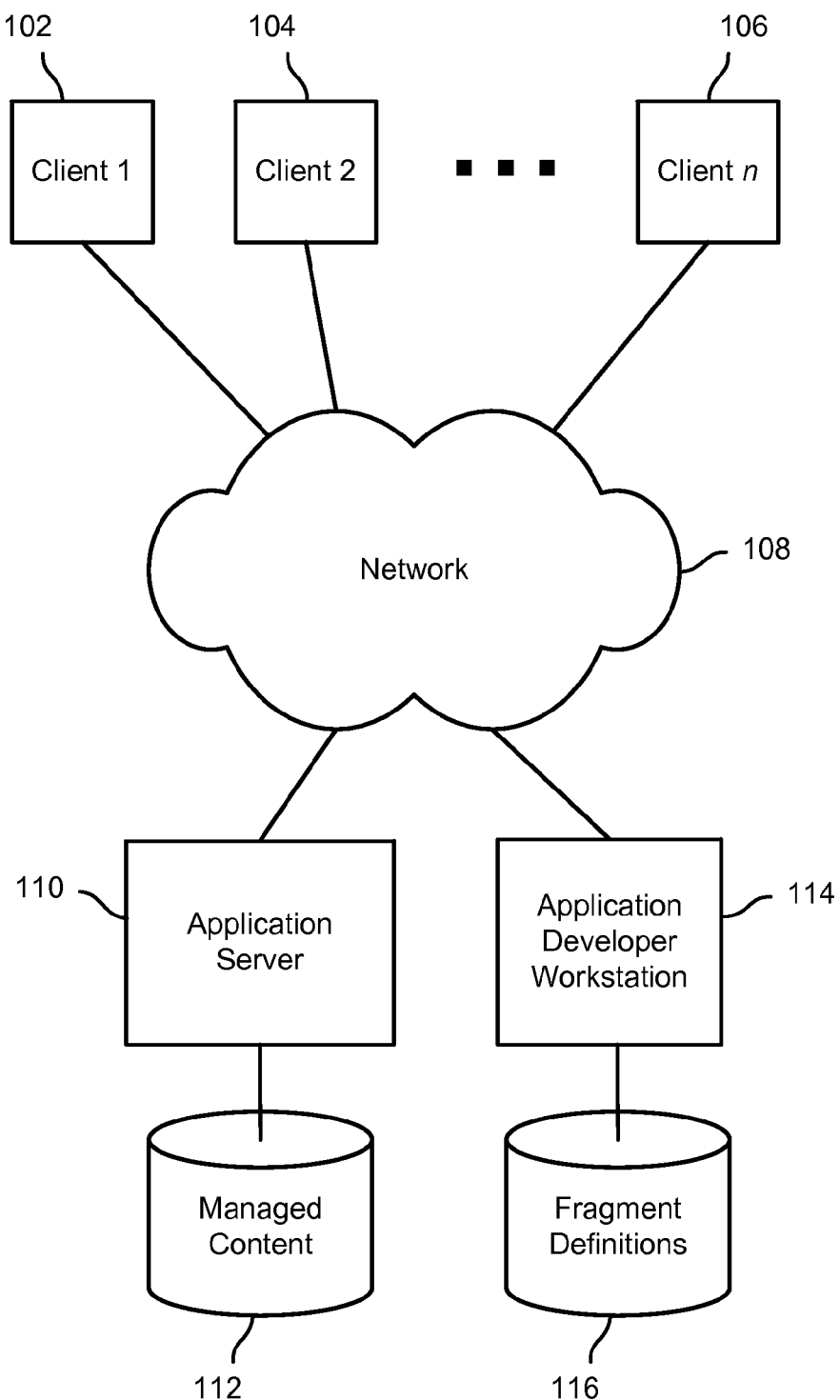
FIG. 1 is a block diagram illustrating an embodiment of an application development system and environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Dynamic discovery and management of page fragments is disclosed. In various embodiments, a developer using a development tool to develop an application comprising developer-composable application pages defines one or more fragments capable of being included in one or more application pages dynamically. A page fragment discovery and management infrastructure is provided. At runtime, based on a developer's definition of a composed page and/or fragment, one or more conditions (e.g., contextual data, such as session or other application variables; event payloads; etc.) may be evaluated to determine dynamically a fragment to be retrieved and included in the page. The fragment may be specified by an identifier and/or determined by evaluating an expression or other logic. Inputs required by the fragment are provided (e.g., context variables). The fragment definition may include a definition of one or more user interface (UI) or other events that may be published and/or consumed by the fragment. In various embodiments, one or more of the inclusion (or not) of a particular fragment and its behavior as included under specific circumstances, including by way of example and without limitation whether or not and/or in what manner it is rendered visibly on the page as displayed, may be determined dynamically, at runtime, e.g., based on context data, UI events, user input, etc.

FIG. 1 is a block diagram illustrating an embodiment of an application development system and environment. In the example shown, a plurality of client systems, representing in FIG. 1 by client systems 102, 104, and 106, connect via a network 108 to an application server 110 associated with a body of managed content 112. In some embodiments, the managed content 112 may be stored in a content management system, such as an EMC® Documentum® system. In various embodiments, a software developer or other user associated with application developer workstation 114, e.g., a personal or other computer, may use a software development tool to create an application to run on application server 110. For example, in some embodiments a developer may use the "xCP Designer" and/or other components comprising the EMC® Documentum® xCP development platform to create applications to run on application server 110, for example in a runtime environment provided on application server 110. The EMC® Documentum® xCP development platform, for example, enables a developer to use visual and other tools to build custom applications that leverage the advanced enterprise content management (ECM) capabilities of EMC® Documentum®.

In the example shown, a development tool associated with application developer workstation 114 enables the developer to compose custom, reusable fragments capable of being included in one or more application pages, e.g. as determined dynamically at runtime as defined by the developer at development time. Fragment definitions created as disclosed herein may be stored in a fragment definition store 116 and may be used at application deployment and/or at runtime to retrieve fragment definitions to be used at runtime to discovery a fragment to be included in a page; to instantiated and include a fragment on a page being displayed; and/or to manage the inputs, outputs, dynamic behavior, etc. of a fragment as included in a page being displayed.

Figure 2:
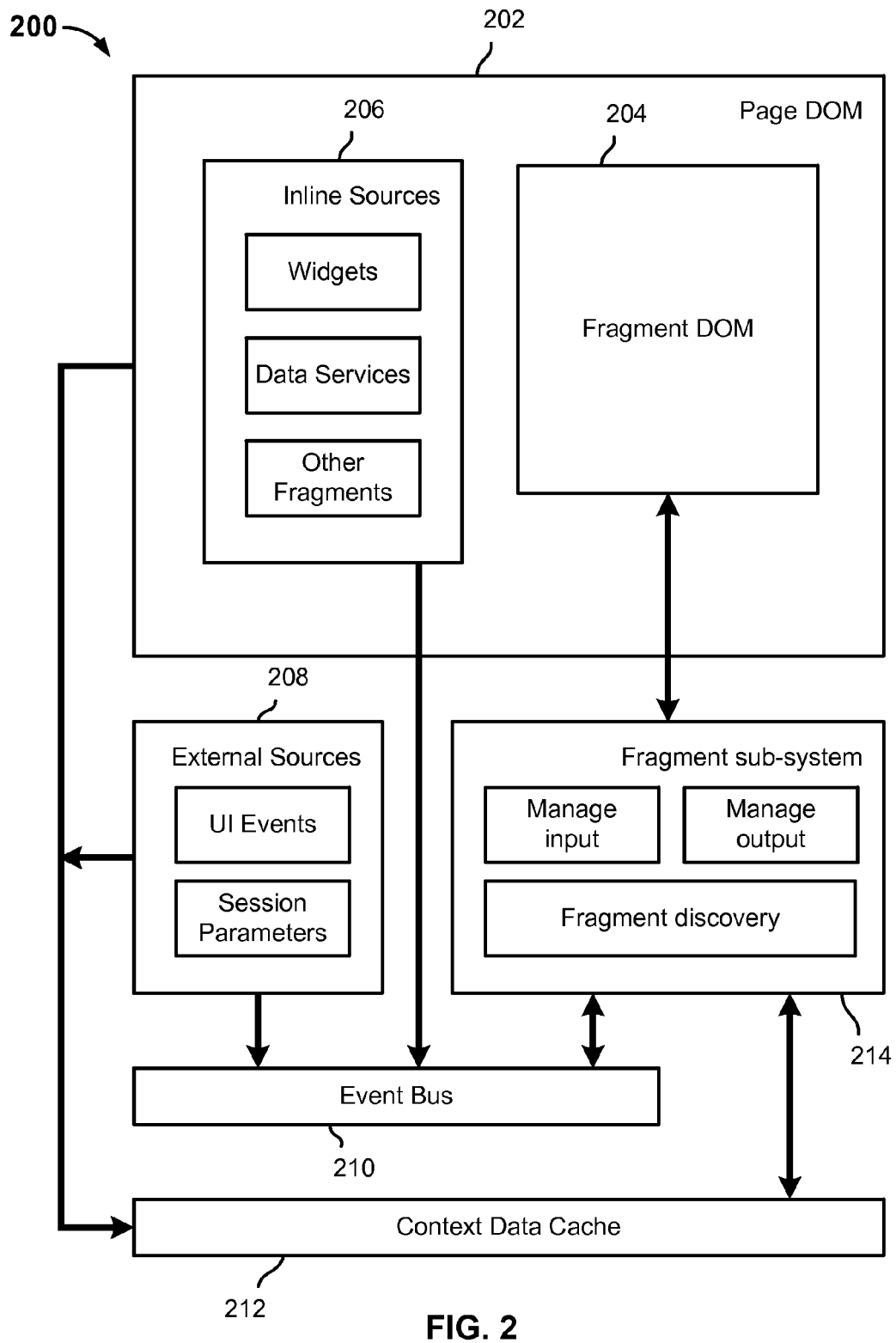
FIG. 2 is a block diagram illustrating an embodiment of a system to discover and manage page fragments.

FIG. 2 is a block diagram illustrating an embodiment of a system to discover and manage page fragments. In the example shown, the system 200 includes a developer-composed application (e.g., user interface) page represented in FIG. 2 by page DOM (Document Object Model) 202. The developer has defined the page to include a fragment, represented in FIG. 2 by Fragment DOM 204. In the example shown in FIG. 2, a set of inline sources 206 represents widgets, data services (e.g., data sources), other fragments, and other elements comprising the page which may have data values associated therewith and/or may generate UI events (e.g., by virtue of user interactions, retrieval and display of data, etc.). In addition, FIG. 2 illustrates external sources 208 comprising externally-generated UI events (e.g., events generated by other pages, etc.) and session parameters. UI or other events generated by and/or otherwise associated with internal sources 206 or external sources 208 may be published via an event bus 210. Likewise, context data comprising, provided by, and/or otherwise associated with internal data sources 206 and/or external data sources 208 (e.g., event payloads, session parameters, etc.) may be stored (e.g., temporarily) in context data cache 212. A fragment sub-system 214 is configured to listen for (e.g., subscribes to) fragment-related events published on event bus 210. Events received by fragment sub-system 214 via event bus 210 may result in a fragment discovery module or other component of fragment sub-system 214 performing processing to discover and retrieve a fragment to be included in the page 202. In various embodiments, potentially depending on the triggering event, page and/or fragment definition, context data, etc., the fragment sub-system 214 may evaluate one or more expression to discover a fragment to be retrieved and included in the page 202. Context data read from context data cache 212 may be included in the expression and used by the fragment sub-system 214 to evaluate the expression for purposes of dynamic discovery of a fragment to be included in page 202.

In the example shown in FIG. 2, the fragment sub-system 214 also manages fragment inputs and/or outputs, as applicable, e.g., as defined by the developer at development time. For example, the fragment sub-system 214 may obtain one or more context data values from the context data cache 212, and may use those values and/or values determined based on those values, to provide inputs to a dynamically discovered and retrieved fragment. In addition, outputs provided by the fragment may be processed by the fragment sub-system 214, as defined by the developer at development time, for example by providing such output data to other fragments and/or other recipients, such as by publishing via event bus 210 a UI or other event having the output data, or values derived therefrom, as a payload.

In various embodiments, a fragment may be defined to include and/or to potentially include, based on a determination made at runtime, one or more other fragments. For example, at runtime a developer-composed expression may be evaluated, and based on a result of the evaluation one or more fragments may be instantiated and included within the fragment with which the expression is associated.

Typically, a fragment is defined to receive, e.g., from the hosting page, one or more inputs, and to provide, e.g., via developer-composed user interface events, one or more outputs. In various embodiments, when composing a page and/or fragment and defining a fragment to be loaded via an expression, the developer is provided with a way to define a fragment "hint" or other default behavior that is to be exhibited in the event that evaluation of an expression at runtime fails to indicate a valid fragment name or other identifier. In some embodiments, the fragment hint takes the value of another fragment. The fragment hint is used as a proxy during composition time and as a fallback at runtime. The fragment hint acts like a proxy at design-time as the actual fragment that might be loaded when the application is running is not known. The system then sees the proxy fragment and uses its inputs and outputs to wire the fragment to the page in which it is embedded.

In various embodiments, the architecture shown in FIG. 2 supports highly dynamic behavior. For example, in some embodiments, dynamic fragment discovery and behavior may be chained, with further fragments being discovered and included and/or other fragments already included in the page being triggered to perform further actions based on the output generated by another fragment on the page.

Figure 3:
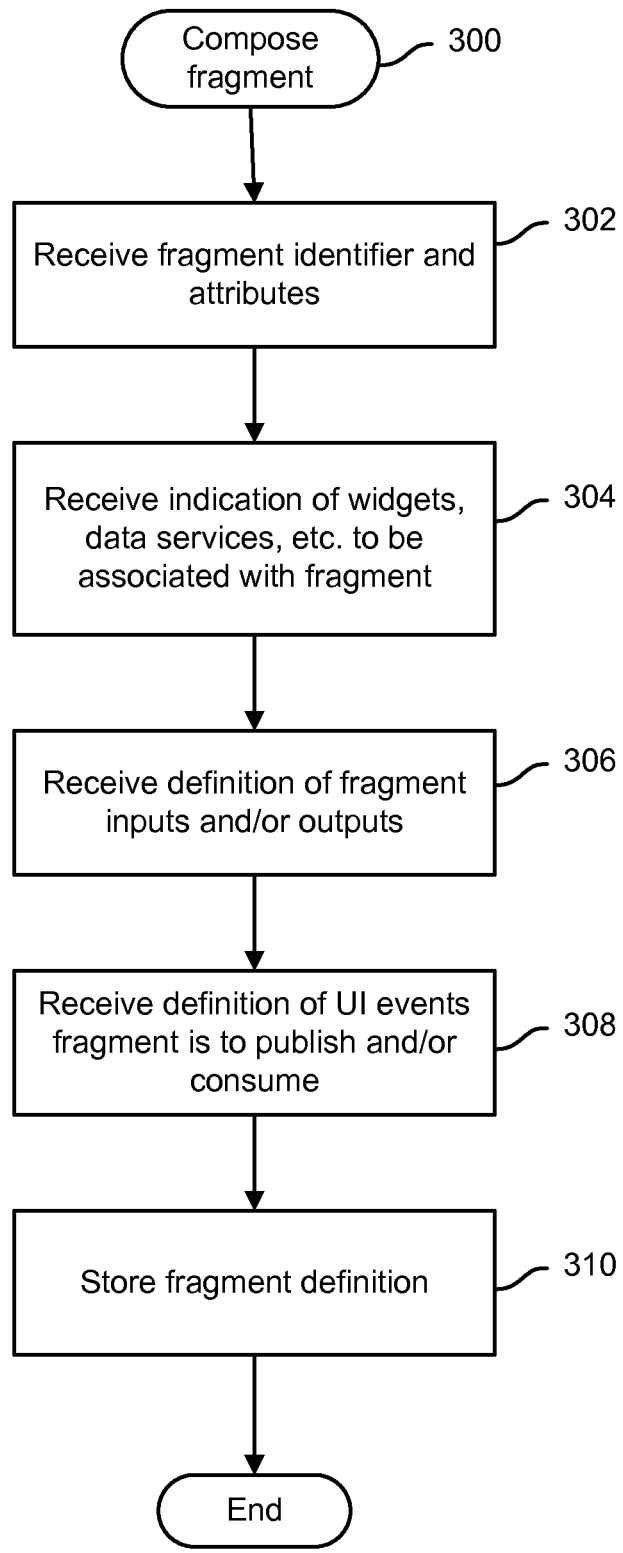
FIG. 3 is a flow chart illustrating an embodiment of a process to compose a page fragment.

FIG. 3 is a flow chart illustrating an embodiment of a process to compose a page fragment. In the example shown, an indication that a new fragment is desired to be composed (300) is received, e.g., via a development tool user interface. A fragment identifier and/or other attributes are received (302). An indication of one or more widgets, data services, etc. to be included in and/or otherwise associated with the fragment is received (304), e.g., via a visual or other interface of the development tool. A definition of one or more inputs to be required by and/or one or more outputs to be generated by the fragment is received (306). In some embodiments, the number, type, nature, value, etc. of inputs may vary depending on conditions, e.g., as defined by a developer-composed expression or otherwise. In some embodiments, a default one of the possible sets of inputs and/or outputs may be defined. A definition of UI or other events to be published and/or consumed (e.g., subscribed to) by the fragment may be received (308). The received fragment definition is stored (310), e.g., for use at application code generation and/or deployment time, and/or at runtime to support dynamic discovery, inclusion, and management of the fragment in an application page.

Figure 4:
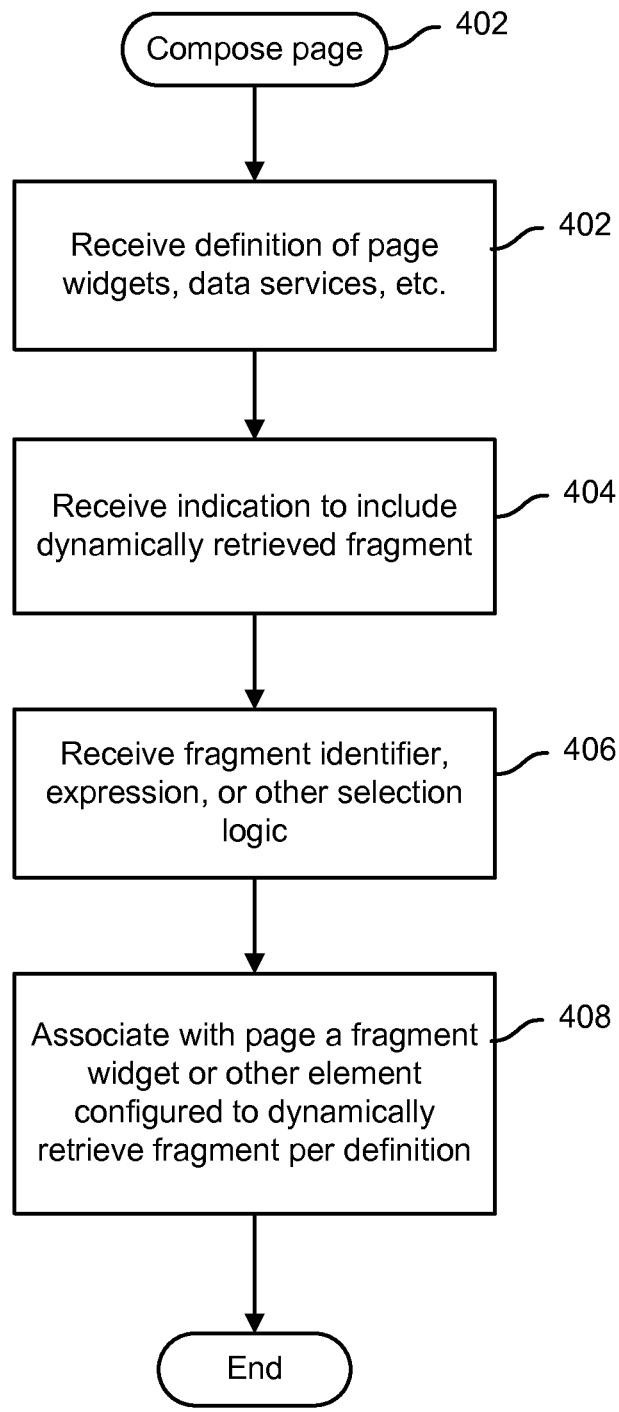
FIG. 4 is a flow chart illustrating an embodiment of a process to compose an application page.

FIG. 4 is a flow chart illustrating an embodiment of a process to compose an application page. In the example shown, upon receiving an indication to compose an application page (400), a definition of the page, e.g., the widgets, data services, and/or other statically-defined elements to be associated with the page, is received (402). An indication to include a dynamically discovered and/or retrieved fragment in the page is received (404). A fragment identifier and/or an expression to be evaluated at runtime to dynamically discover the fragment to be included is/are received (406). An element configured to dynamically discover and retrieve the correct fragment at runtime, based on the conditions and/or criteria included in the page definition, is associated with the page (408). In some embodiments, at runtime a fragment widget is associated with the page. The fragment widget is not visibly displayed, but performs or participates in the performance of one or both of fragment discovery and fragment management for the page, as defined by the developer.

Figure 5:
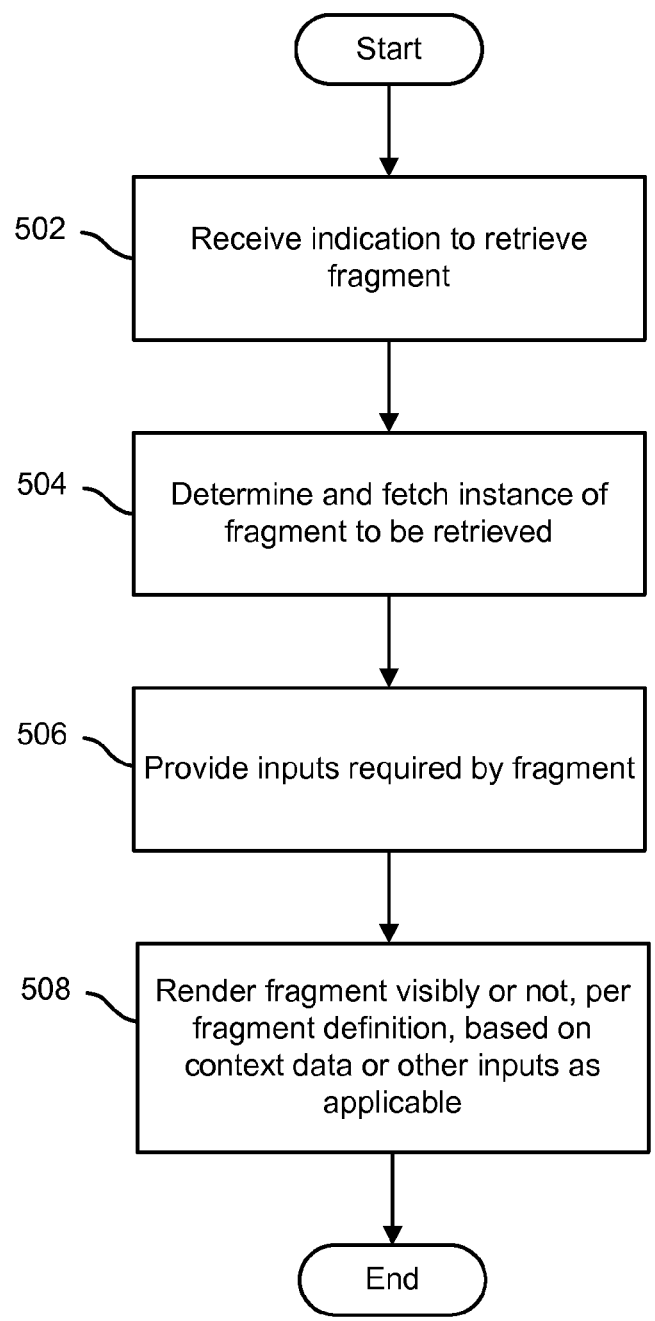
FIG. 5 is a flow chart illustrating an embodiment of a process to discover and manage page fragments.

FIG. 5 is a flow chart illustrating an embodiment of a process to discover and manage page fragments. In various embodiments, all or part of the process of FIG. 5 may be performed at runtime, e.g., by a fragment widget, a fragment sub-system, and/or other objects and/or components. In the example shown, an indication to discover dynamically and retrieve a fragment is received (502). For example, a UI or other event published by another fragment and/or another page element may be received, data retrieved from a data service or other source may be of a type and/or have a data value that triggers fragment discovery and/or retrieval, etc. The fragment to be retrieved is determined (e.g., by evaluating an expression, as described above) and an instance of the fragment is create, e.g., by retrieving a fragment definition of the fragment (504). One or more inputs required by the fragment, if any, are provided to the fragment (506). The fragment may be rendered visibly on the page, or not, depending on factors such as the fragment definition and context information, such as event payloads, session variables, and/or other context data evaluated at runtime. Behavior of the retrieved fragment may continue to be determined dynamically over time, depending on the fragment definition and whether the page context (e.g., session variables, page element variables, UI events, data values retrieved from data services associated with the page, etc.) changes while the fragment is associated with the page.

Using techniques disclosed herein, highly dynamic application page behaviors may be provided in applications composed by users of a development tool, including behaviors that cannot be known in advance by a provider of the development tool.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing a dynamic application user interface, comprising:
   receiving at a fragment subsystem an indication to add a fragment dynamically to a current application page displayed by a user interface, wherein receiving the indication to add the fragment dynamically includes receiving the indication from a second fragment;
   determining in response to the indication the fragment to be added at least in part by evaluating an expression associated with the indication, the expression including page context data of the current application page read from a context data cache, and wherein the page context data is used by the fragment subsystem to evaluate the expression to discover the fragment to be added;
   adding by the fragment subsystem the determined fragment dynamically to the current application page, wherein one or more fragments of the current application page are configured to perform one or more actions based at least in part on an output of the determined fragment; and
   rendering the determined fragment that has been added to the current application page in the current application page based at least in part on a page context of the current application page, wherein a first page context causes the determined fragment that has been added to the current application page to be rendered visibly in the current application page and a second page context causes the determined fragment that has been added to the current application page to at least be partly hidden from view in the current application page based at least in part on a fragment definition associated with the determined fragment.

2. The method of claim 1, wherein receiving the indication to add the fragment dynamically includes receiving a user interface event.

3. The method of claim 2, wherein the fragment to be added is determined dynamically based at least in part on the user interface event.

4. The method of claim 3, wherein the fragment to be added is determined dynamically based at least in part on a payload data comprising the user interface event.

5. The method of claim 1, wherein adding the determined fragment dynamically to the current application page includes retrieving a fragment definition associated with the determined fragment.

6. The method of claim 1, wherein adding the determined fragment dynamically to the current application page includes providing to the fragment an input value required by the fragment.

7. The method of claim 6, wherein the input value required by the fragment is determined based at least in part by a fragment definition associated with the determined fragment.

8. The method of claim 1, wherein the fragment added dynamically to the page is configured to publish an event.

9. The method of claim 1, wherein the fragment added dynamically to the page is configured to publish an output.

10. The method of claim 9, wherein the output comprises one or more output data values and further comprising providing at least a subset of the one or more output data values to one or more other elements of the current application page.

11. The method of claim 10, wherein providing at least a subset of the one or more output data values to one or more other elements of the current application page includes transforming said at least a subset of the one or more output data values.

12. The method of claim 1, wherein the fragment is configured to exhibit a first behavior in the first page context of the current application page and a second behavior in the second page context of the current application page.

13. The method of claim 1, wherein receiving an indication to add a fragment dynamically to a current application page comprises receiving an indication to add the fragment dynamically to another fragment comprising the current application page.

14. The method of claim 13, wherein the fragment to be added is defined using an expression and further comprising adding a default fragment in the event a valid fragment to be added cannot be determined based on the expression.

15. A system, comprising:
    a display; and
    a processor coupled to the display and a non-transitory memory containing instructions executable by processor to:
    receive at a fragment subsystem an indication to add a fragment dynamically to a current application page displayed on the display, wherein to receive the indication to add the fragment dynamically includes to receive the indication from a second fragment;
    determine in response to the indication the fragment to be added at least in part by evaluating an expression associated with the indication, the expression including page context data of the current application page from a context data cache, and wherein the fragment subsystem is configured to use the page context data to evaluate the expression to discover the fragment to be added;
    add by the fragment subsystem the determined fragment dynamically to the current application page, wherein one or more fragments of the current application page are configured to perform one or more actions based at least in part on an output of the determined fragment; and
    render the determined fragment that has been added to the current application page in the current application page based at least in part on a page context of the current application page, wherein a first page context causes the determined fragment that has been added to the current application page to be rendered visibly in the current application page and a second page context causes the determined fragment that has been added to the current application page to at least be partly hidden from view in the current application page based at least in part on a fragment definition associated with the determined fragment.

16. The system of claim 15, wherein the processor is further configured to retrieve a fragment definition associated with the determined fragment.

17. A computer program product to provide a dynamic application user interface, the computer program product being embodied in a non-transitory computer readable storage medium and comprising computer instructions for:

receiving at a fragment subsystem an indication to add a fragment dynamically to a current application page displayed by a user interface, wherein receiving the indication to add the fragment dynamically includes receiving the indication from a second fragment;

determining in response to the indication the fragment to be added at least in part by evaluating an expression associated with the indication, the expression including page context data of the current application page from a context data cache, and wherein the fragment subsystem is configured to use the page context data to evaluate the expression to discover the fragment to be added;

adding by the fragment subsystem the determined fragment dynamically to the current application page, wherein one or more fragments of the current application page are configured to perform one or more actions based at least in part on an output of the determined fragment; and rendering the determined fragment that has been added to the current application page in the current application page based at least in part on a page context of the current application page, wherein a first page context causes the determined fragment that has been added to the current application page to be rendered visibly in the current application page and a second page context causes the determined fragment that has been added to the current application page to at least be partly hidden from view in the current application page based at least in part on a fragment definition associated with the determined fragment.

* * * * *

UNITED STATES PATENT AND TRADEMARK OFFICE
CERTIFICATE OF CORRECTION

PATENT NO. : 9,756,147 B1
APPLICATION NO. : 14/136255
DATED : September 5, 2017
INVENTOR(S) : Sachin G. Totale et al.

Page 1 of 1

It is certified that error appears in the above-identified patent and that said Letters Patent is hereby corrected as shown below:

In the Claims

Claim 15:
Column 6, Line 43, insert -- the -- between "by" and "processor"

Signed and Sealed this
Twenty-fifth Day of June, 2019

Andrei Iancu
*Director of the United States Patent and Trademark Office*